United States Patent [19]

Chatterjea

[11] Patent Number: 4,871,048
[45] Date of Patent: Oct. 3, 1989

[54] CONTROL SYSTEM FOR VEHICLE TRANSMISSIONS

[75] Inventor: Probir K. Chatterjea, Mt. Prospect, Ill.

[73] Assignee: Dresser Industries, Inc., Dallas, Tex.

[21] Appl. No.: 99,348

[22] Filed: Sep. 21, 1987

[51] Int. Cl.⁴ .............................................. F16D 25/11
[52] U.S. Cl. ............................... 192/3.58; 192/87.19; 192/109 F
[58] Field of Search ................. 192/109 F, 87.19, 3.58

[56] References Cited

U.S. PATENT DOCUMENTS

| | | | |
|---|---|---|---|
| 3,618,424 | 11/1971 | Golan et al. | 192/109 F X |
| 3,809,201 | 5/1974 | Miyanishi et al. | 192/109 F |
| 3,818,776 | 6/1974 | Prenzel et al. | 192/109 F X |
| 3,990,553 | 11/1976 | Holzinger et al. | 192/109 F X |
| 3,991,865 | 11/1976 | Komatsu | 192/109 F |
| 4,046,160 | 9/1977 | Horsch | 192/109 F X |
| 4,086,994 | 5/1978 | Hirosawa et al. | 192/109 F |
| 4,132,302 | 1/1979 | Chatterjea | 192/109 F X |
| 4,138,004 | 2/1979 | Horsch | 192/109 F X |
| 4,219,109 | 8/1980 | Ushijima et al. | 192/109 F X |
| 4,387,731 | 6/1983 | Chatterjea | 192/109 F X |

FOREIGN PATENT DOCUMENTS 8700596  1/1987  World Int. Prop. O. ...... 192/109 F

*Primary Examiner*—Rodney H. Bonck
*Attorney, Agent, or Firm*—Edward G. Fiorito; William R. Peoples; Roy L. Van Winkle

[57] ABSTRACT

A transmission control system for actuating a hydraulically controlled vehicle transmission that includes a pair of shiftable valve members determining four range speed conditions and two shiftable valve members determining whether the vehicle is in forward or reverse. Operating in conjunction with the speed range valve members is a fill control system which provides for rapid filling of the clutches and a pressure control system which provides for the controlled rate of energization of the clutches once the clutches have been filled to eliminate shift shock.

12 Claims, 6 Drawing Sheets

CONTROL SYSTEM FOR VEHICLE TRANSMISSIONS

BACKGROUND OF THE INVENTION

This invention relates generally to an improved hydraulic control system for actuating a vehicle transmission. More particularly, but not by way of limitation, this invention relates to a hydraulic or electro-hydraulic control system for providing rapid smooth shifting of heavy vehicle transmissions.

Transmissions for heavy duty vehicles such as earth moving equipment frequently utilize hydraulic clutches which provide a multiplicity of speeds or ranges and also provide forward and reverse directions. The actuating and deactuation of such clutches requires that the clutch being engaged be filled rapidly and provided with sufficient pressure to fully energize the clutch.

While the foregoing have been successfully accomplished in the past, some problems have been encountered. For example, rapid filling of the clutches has frequently resulted in shift shock or jerk due to high clutch pressure at the start of clutch pressure modulation. Attempts to eliminate the jerk have required that the filling rate be lowered, and thus it takes an undesirable time to energize the clutch.

Other attempts to provide rapid fill with smooth engagement have resulted in unusually complex control apparatus in which it was sometimes possible to engage simultaneously both directional clutches or two of the range or speed clutches. This situation is, of course, extremely undesirable.

Another problem that has been encountered with such vehicles and hydraulically controlled transmissions has been the desirability of providing an emergency backup system that permits operation of the vehicle in the event of electrical failure. Most vehicles in the past have been provided with a backup system, but many have been extremely cumbersome, located poorly, or very difficult to utilize.

SUMMARY OF THE INVENTION

This invention provides an improved control system for heavy vehicle transmissions that can be quickly and easily shifted without transmission shock and that includes an emergency backup that is easy to operate and immediately available to the operator.

In one aspect, this invention provides a hydraulic control system for actuating a transmission that includes a hydraulic clutch wherein the system comprises: valve means for controlling fluid flow to and from the clutch; clutch fill control means for rapidly filling the clutch when the clutch is to be actuated; and pressure control means for lowering the pressure of fluid in the clutch after filling and for gradually increasing the pressure in the clutch until the clutch is fully engaged.

In another aspect, this invention provides a method of shifting a transmission that includes hydraulic clutches. The method comprises the steps of: rapidly filling the clutch with hydraulic fluid; reducing the pressure in the clutch; and applying pressure at a controlled rate to engage the clutch to complete the shift without shock.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 1 is a fragmentary view of a portion of FIG. 5 illustrating a modification of a control valve that is also constructed in accordance with the invention.

DETAILED DESCRIPTION OF THE PREFERRED EMBODIMENT

Figure 1:
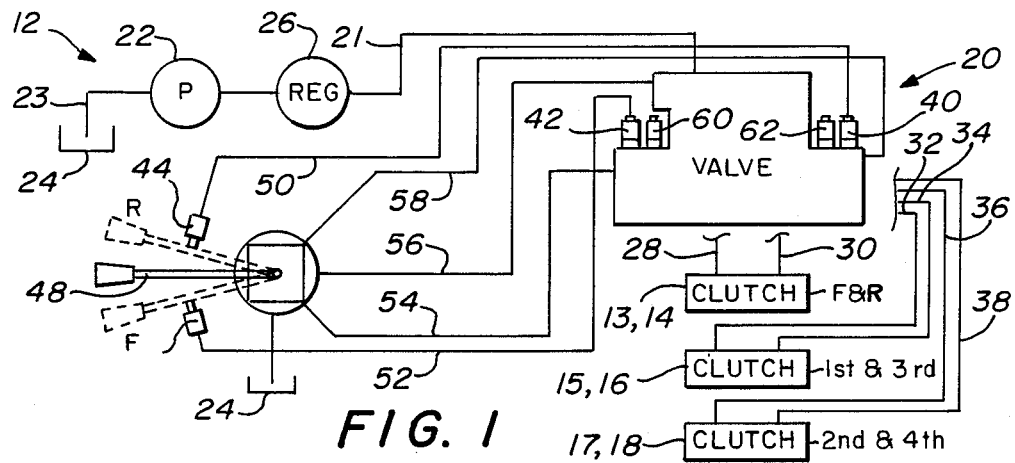
FIG. 1 is a schematic diagram illustrating a hydraulic control system that has been constructed in accordance with invention.

Referring to the drawing and to FIG. 1 in particular, shown therein and generally designated by the reference character 12 is a control system for a transmission (not shown) that includes forward and reverse clutches 13 and 14 and first and third range clutches 15 and 16 and second and fourth range clutches 17 and 18.

To supply hydraulic fluid under pressure to the clutches 13 through 18, control valve means generally designated by the reference character 20 is connected to a hydraulic fluid pump 22 by a conduit 21. The pump 22 is also connected with a hydraulic fluid reservoir 24 by a conduit 23. Interposed in the conduit 21 between the pump 22 and the valve means 20 is a fluid pressure regulator 26 that is typically set to supply fluid at about 350 p.s.i.

The valve means 20 is connected by conduits 28 and 30 with the forward and reverse clutches 13 and 14, by conduits 32 and 34 to first and third range clutches 15 and 16, by conduits 36 and 38 to the second and fourth range clutches 17 and 18. The valve means 20 is provided with solenoids 40 and 42 which control the forward and reverse clutches 13 and 14 as will be described in detail hereinafter.

To actuate the solenoids 40 and 42, switches 44 and 46 form part of a forward and reverse electrical control that is designated by the reference character 48. The switches 44 and 46 are connected by conductors 50 and 52, respectively, with the solenoids 40 and 42. Drain conduits from the solenoids 40 and 42 are provided with restrictions or orifices 53 and 55, respectively (see FIG. 2).

The forward and reverse control 48 also includes a hydraulic control system that will be described more fully in connection with FIG. 4. However, note that the control 48 is connected to the reservoir 24 and by conduits 54, 56 and 58 with the control valve means 20.

The control valve means 20 is also provided with solenoid valves 60 and 62. The solenoids 60 and 62 function to control the speed range clutches 15 through 18 as will also be more fully described hereinafter.

Figure 2:
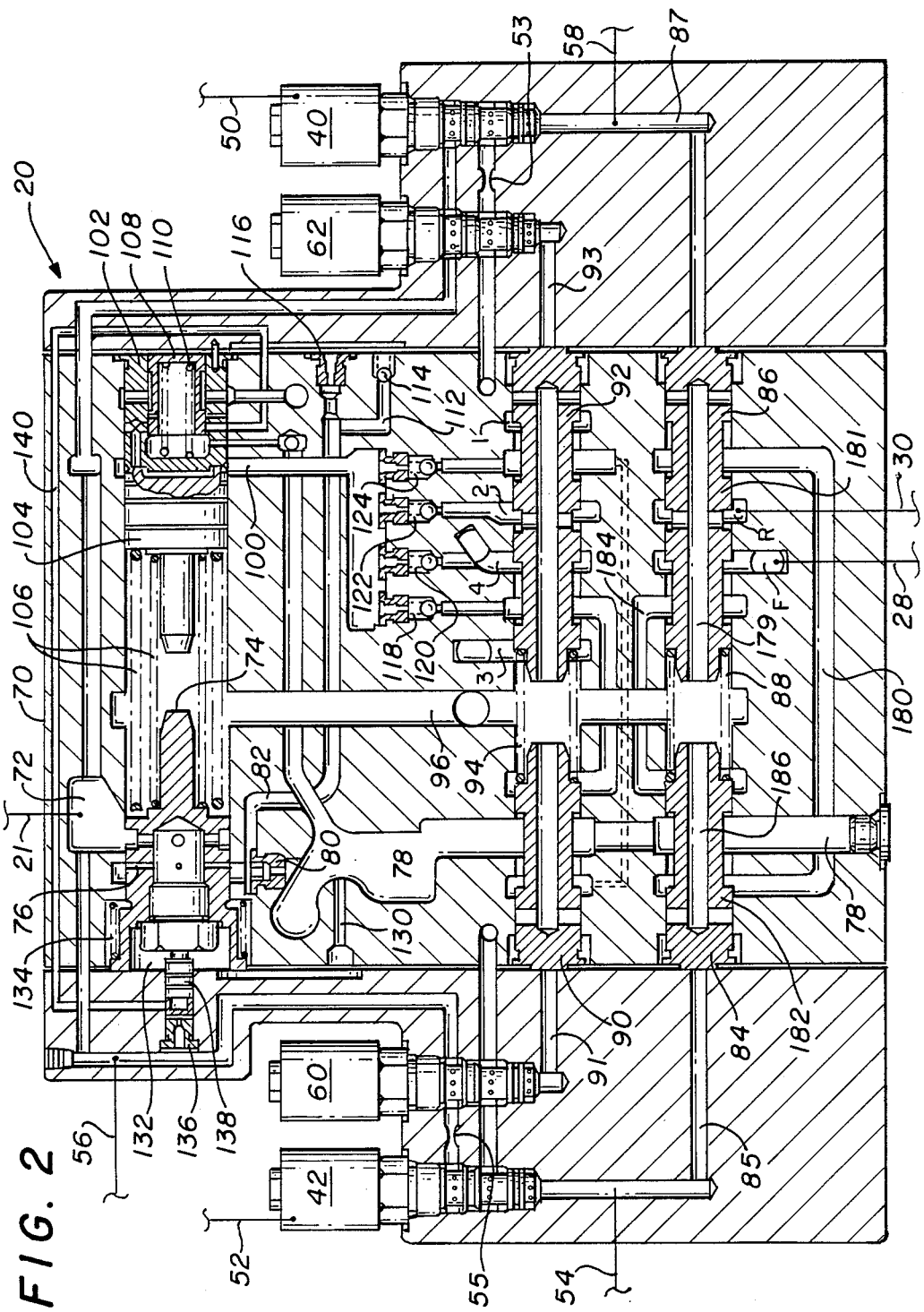
FIG. 2 s a cross-sectional view, somewhat schematic, of a control valve used in the system of FIG. 1 that is also that has been constructed in accordance with invention.

Shown in FIG. 2 is a cross-sectional view of the control valve means 20 which is made partially schematic for purposes of illustration. The control valve means 20 includes a housing 70 which for purposes of manufacturing may be constructed from several parts.

The fluid pressure conductor 21 is connected to a flow passageway 72 in the housing 70. Fluid from the passageway 72 enters the interior of a flow control member 74 and flows outwardly therefrom through orifices 76 into a fluid supply passageway 82. Flowing through the passageway 82 the fluid passes through an orifice 80 to a connected passageway 78. Fluid flowing through the orifice 80 causes the pressure in the passageway 82 to be greater than the fluid pressure in the passageway 78.

The passageway 78 is arranged to provide hydraulic fluid to two sets of valves that control the flow of hydraulic fluid to and from the clutches. Near the bottom of the control means 20, there is provided first and second valve members or spools 84 and 86 that are arranged for movement within the housing 70. A spring 88 is disposed between the members 84 and 86 and constantly biases them apart and toward the left and right sides of the valve housing 70, respectively. The valve members 84 and 86 control the flow of hydraulic fluid to the forward and reverse clutches 13 and 14.

The valve member 84 is subject to hydraulic fluid applied by solenoid 42 thereto through a passageway 85 formed in the valve housing 70. Similarly, the valve member 86 is exposed to fluid pressure applied by the solenoid 40 through a passageway 87 also formed in the valve housing 70.

A second set of valve members is located in the valve housing 70 that are provided to control flow of hydraulic fluid to the speed or range clutches 15 through 18. This set of valve members includes a valve member 90 and a valve member 92, each of which is movable within the valve housing 70. Like the valve members 84 and 86, the valve members 90 and 92 are biased relatively apart and toward the left and right sides of the valve housing 70 by a spring 94. The spaces between the valve members 84 and 86 and between the valve members 90 and 92 are connected by a passageway 96 with the reservoir 24.

The valve member 90 is responsive to pressure applied by the solenoid valve 60 through a passageway 91 formed in the valve housing 70. Similarly, the valve member 92 is responsive to pressure applied by the solenoid 62 through a passageway 93, also formed in the housing 70.

A variable volume signal chamber 100 is located within the housing 70. The upper end of the signal chamber 100 is defined by a spacer member 102 that is fixed in the housing 70 and a movable rate control member 104. It will be noted that the movable rate control member 104 is arranged in back-to-back relationship to the flow control member 74. The members 74 and 104 are held biased relatively apart by springs 106. Pressure in the chamber 100 is always equal to the force of springs 106 divided by cross section area of control member 104.

Within the spacer 102, there is located a trigger spool 108 that is movable therein. The spool 108 is retained in the position illustrated in FIG. 2 by a spring 110. The force exerted by the spring 110 must be overcome by the differential in pressure between the hydraulic fluid pressure in the conduits 78 and 82 before the trigger spool 108 will move against the spring 110. Full fluid flow to the trigger spool 108 is provided by an auxiliary passageway 112 in conjunction with a check valve 114. Orifice 116 is located in the passageway 82 so the fluid flowing from the trigger spool 108 in the reverse direction through the conduit 82 is inhibited.

The signal chamber 100 is provided with hydraulic fluid from the clutches 15 through 18 through orifice and check valve assemblies 118, 120, 122 and 124. The orifice and check valve assembly 124 is connected to the conduit 32 at port 1. The check valve and orifice assembly 122 is connected to the conduit 34 at port 2, the check valve and orifice assembly 120 is connected with the conduit 38 at port 4. The check valve and orifice assembly 118 is connected with the conductor 36 at port 3. It will be noted that the fluid flowing from the passageway 78 passes through the ports 1, 2, 3 and 4 into the various clutches upon appropriate positioning of the valve members 90 and 92.

The orifices included in the orifice and check valve assemblies are provided for the purpose of regulating the rate of flow of fluid into the signal chamber 100 from the various clutches. The check valves in such assemblies are provided to prevent flow of fluid from the signal chamber 100 toward the clutches which could result in a false signal and restart the automatic cycle of the control system.

It will also be noted at this point that the hydraulic fluid in the passageway 78 reaches the forward and reverse clutches 13 and 14 through the conduits 28 and 30. The conduits 28 and 30 are connected, upon proper manipulation of the valve members 84 and 86, to the ports F and R.

Solenoid valves 40 and 42 are connected at the ends of the valve members 86 and 84, respectively, for the purpose of moving those valve members in the housing 70, as will be described. Similarly, the solenoids 60 and 62 are connected to provide hydraulic fluid under pressure to the ends of the valve members 90 and 92, respectively, for the purpose of moving those valve members.

A branch passageway 130 is connected to the passageway 78 and leads to a chamber 132 formed in the end of the flow control member 74. Thus, pressure in the passageway 78 is exerted against the flow control member 74 that urges that valve control member against the force of the springs 106, as well as against a spring 134.

The passageway 72 is connected through an orifice member 136 in such a manner as to exert pressure therein against a piston or slug 138 that is movable in the housing 70. The piston 138 has one end in engagement with the pressure control member 74 in the position shown in FIG. 2. Fluid downstream of the orifice member 136 flows through a passageway 140 to the trigger valve 108.

It will be noted that the orifice member 136, the piston 138 and the flow control member 74 comprise portions of a subsystem within the control valve means 20 which may generally be referred to as the flow control system. Similarly, the rate controlmember 104, along with the orifice and check valve assemblies 118, 120, 122 and 124 and the trigger valve 108, comprise a subsystem which may be generally referred to as the pressure control system. The valve members or spools 84, 86, 90 and 92 may generally be referred to as valve means for controlling fluid flow to and from the various clutches.

Figure 3:
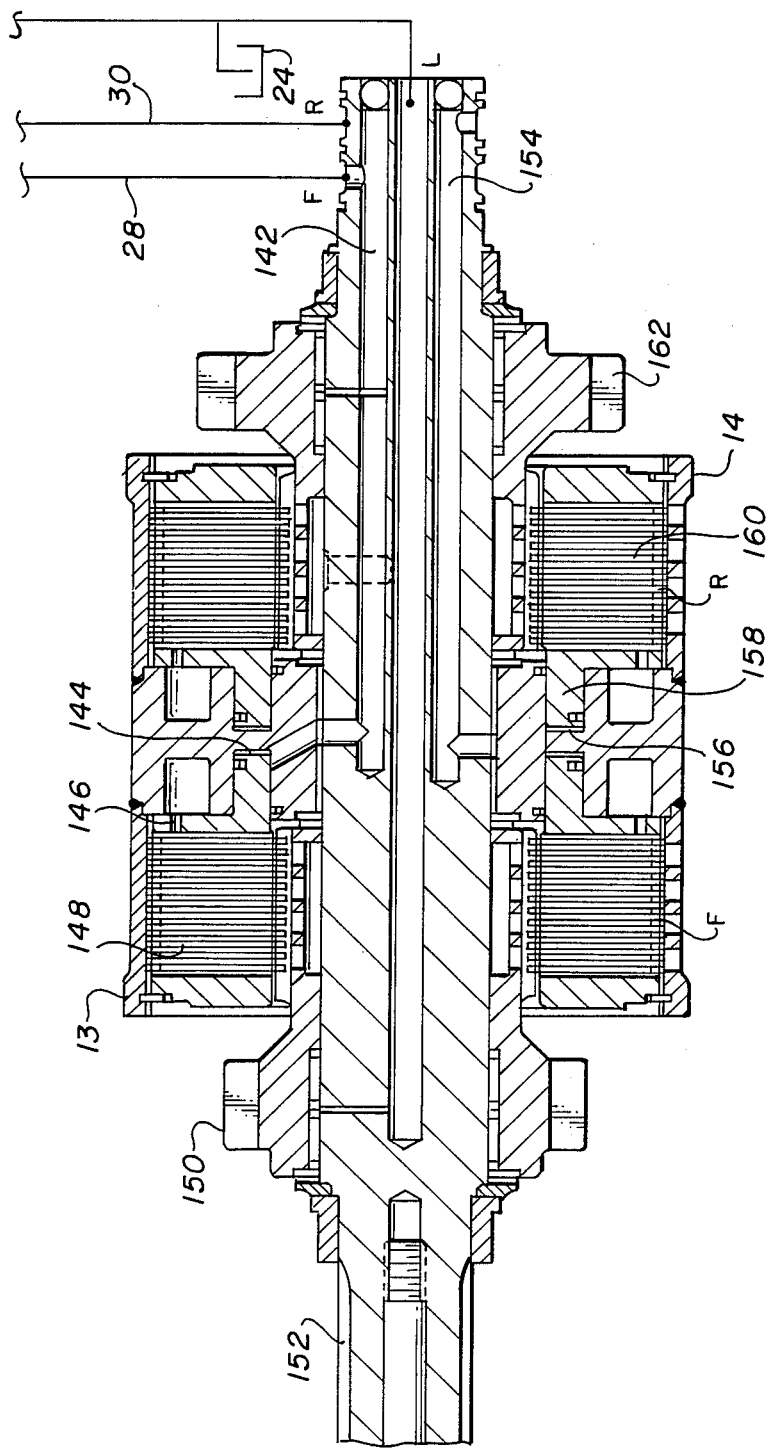
FIG. 3 a cross-sectional view of a hydraulically actuated clutch that may be used with the control valve of FIG. 2.

FIG. 3 illustrates, somewhat in detail, the structure of a pair of typical hydraulically actuated clutches that are used in heavy duty vehicle transmissions. For convenience of size and space, the clutches are frequently combined in pairs as illustrated by the forward and reverse clutches 13 and 14. The forward clutch 13 is supplied by the conduit 28 through a passageway 142 into a space 144 behind a clutch actuating piston 146. The clutch 13 includes various plates 148 that are, upon movement of the piston 144 to the left, brought into frictional engagement causing the gear 150 to rotate with the shaft 152.

Similarly, the reverse clutch 14 is supplied by the conduit 30 through passageway 154 into a chamber or space 156 behind the reverse clutch piston 158. The reverse clutch 14 is also provided with a plurality of plates 160 which, upon movement of the piston 158, are brought into frictional engagement causing the gear 162 to rotate with the shaft 152. The clutches 16 and 18 are not illustrated in detail, but it will be understood that they may be similarly arranged to the clutches 13 and 14.

In describing the overall system in connection with FIG. 1, it was mentioned that the direction selector 48 included a hydraulic backup system. The hydraulic backup system provides reverse and forward movement for the vehicle in the event that the electrical system operating the valve 48 fails. A hydraulic valve 170 (see FIG. 4) is connected into the valve system by a conductor 58 which is connected to the conduit or passageway containing the reverse signal and the conductor 54 which is connected to the passageway containing the forward drive signal. Hydraulic fluid is supplied to the valve 170 through the conduit 56 and a return conduit is provided to the reservoir 24.

Figure 4:
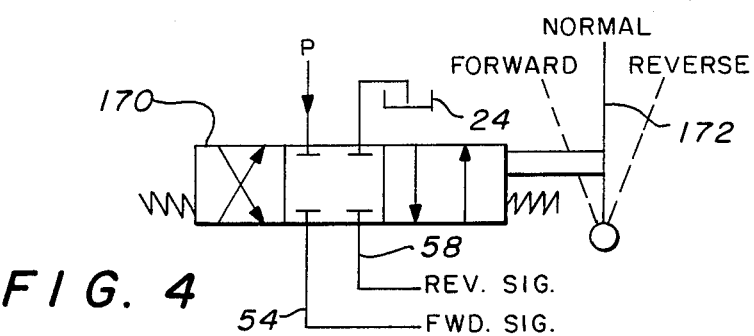
FIG. 4 is a schematic diagram illustrating the emergency valve arrangement useful with the control valve of FIG. 2.

When the electrical control system is operating properly, an operating lever 172 on the hydraulic valve 170 is in a normal position as illustrated in FIG. 4. Should the electrical circuit fail, the lever 172 is moved to the forward or reverse position as appropriate and when in the forward position, moves the valve into the position wherein the pressure conduit 56 is connected to the forward signal conduit 54 to place the transmission in forward drive while the reverse signal conductor 58 is connected to the reservoir 24. Alternatively, when it is desired to move in a reverse direction, the valve is shifted by the lever 172, moving the valve to a position wherein the forward signal conduit 54 is connected to the reservoir 24 and the pressure conduit 56 is connected to the reverse signal conduit 58 to place the transmission in reverse. Some fluid from conduit 58 will return to reservoir 24 through the disabled solenoid valve 40. However, orifice 53 placed in the drain path of solenoid valve 40 restricts the flow and builds up enough pressure in passage 87 to shift valve member 86.

MODIFICATION OF FIG. 11

Figure 5:
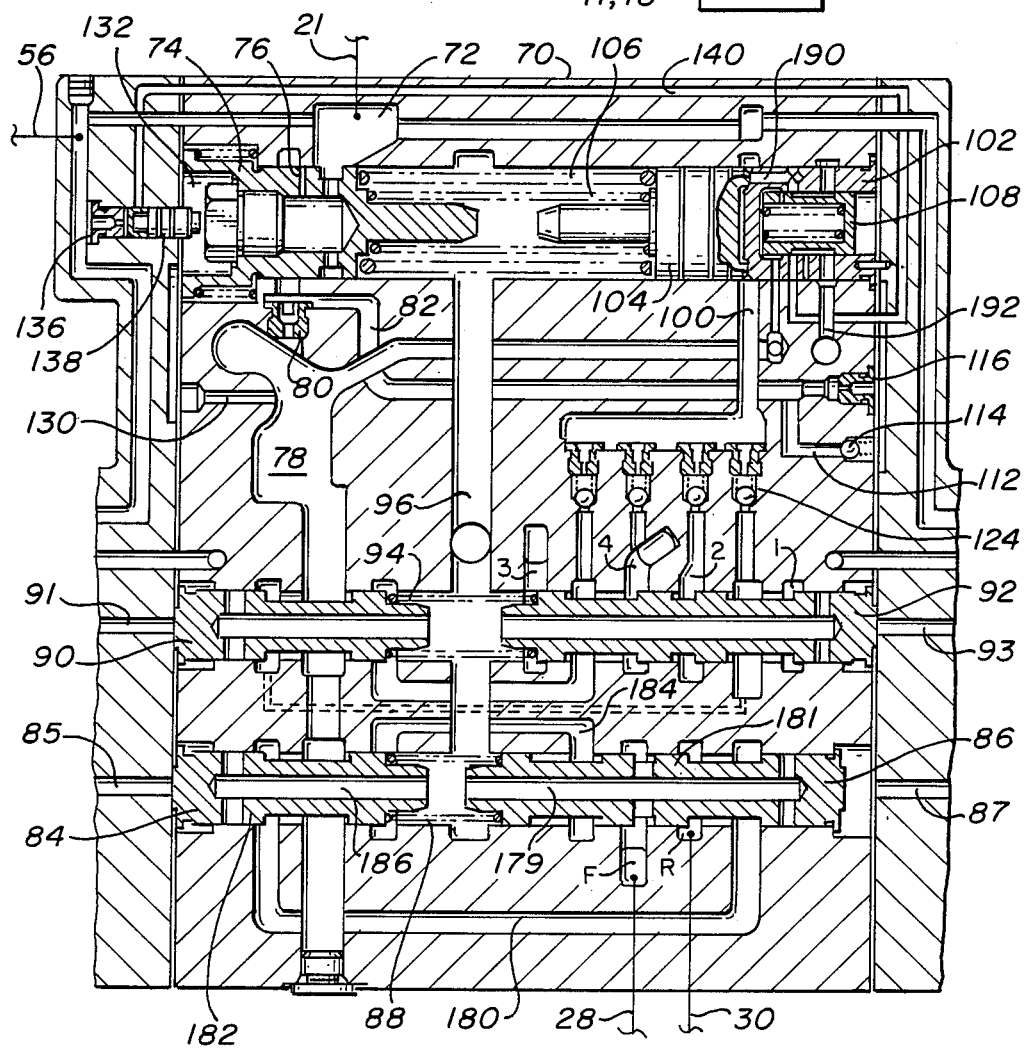
FIG. 5 is a view similar to FIG. 2, but illustrating the various parts of the control valve in the position that they occupy during the filling phase of the clutch when the transmission is in the first speed range an reverse drive.
Figure 11:
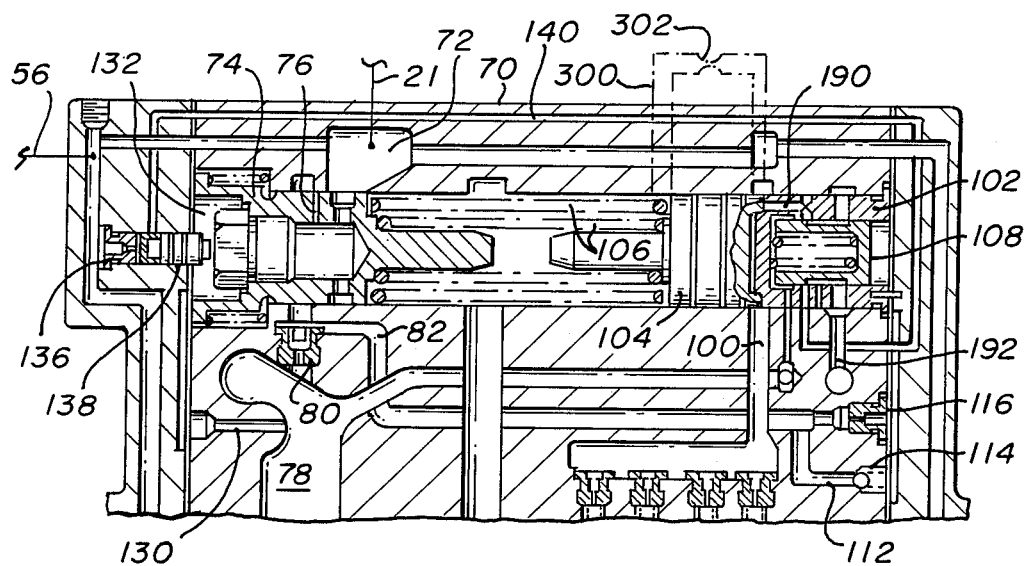

Providing a slow rise rate in the initial part of clutch engagement is sometimes desireable to minimize shift shock. FIG. 11 is a fragmentary view of a portion of FIG. 5 schematically illustrating a modified form of control valve to accomplish the desired fill rate.

The modification is performed by adding a passageway 300 that extends from the signal chamber 100 to the bore for the modulator piston 104. An orifice 302 is located in the passageway 300 to restrict flow from the signal chamber 100 into the bore of the modulator piston 104. The orifice 302 can be varied in size to control the initial rise rate.

OPERATION OF THE PREFERRED EMBODIMENT

Forward and Reverse - When the system is in the condition illustrated in FIG. 2, the valve members 84 and 86 are in the position wherein flow is not provided to either the forward or reverse clutches. In other words, the transmission is in a neutral condition so far as forward and reverse are concerned. Therefore, the vehicle in which the transmission is installed will not move. Fluid pressure in the passageway 78 flows past the valve member 84 into a passageway 180 which is dead ended due to the presence of the land 181 on the valve member 86.

When it is desired to shift the transmission into reverse, the directional control 48 is shifted into engagement with the switch 44 which energizes the solenoid 40 causing pressurized fluid to flow through the passageway 87 in the housing 70, moving the valve member 86 relatively to the left as illustrated in FIG. 5. The land 181 has moved past the port R, thus connecting the passageway 180 through the port R with the conduit 30 leading to the reverse clutch 14. Shifting from reverse to forward requires repositioning the direction control 48 so that the switch 46 is closed, energizing the solenoid 42 and simultaneously deenergizing the solenoid 40 so that the spring 88 drives the valve member 86 to the position illustrated in FIG. 2.

Energizing the solenoid 42 causes fluid under pressure to flow through the passageway 85, moving the valve member 84 to the right. A land 182 located on the valve member 84 connects the passageway 180 to reservoir through passageway 186 and opens a passageway 184 connecting the passageway 78 with the port F to begin energizing the forward clutch 13 through the conductor 28.

It should also be pointed out that when the valve member 86 is in the leftmost position illustrated in FIG. 5, the port F is connected through an internal passageway 179 in the valve member 86 with the passageway 96 which leads to the reservoir 24. Thus, the forward clutch 13 is dumped as the reverse clutch 14 is filled. Similarly, movement of the valve member 84 to the right to energize the forward clutch 13 connects an internal passageway 186 therein to the passageway 180 and to the passageway 96 which leads to the reservoir 24 dumping the reverse clutch 14 when the forward clutch 13 is energized.

Although not illustrated, it will be appreciated that if both of the valve members 84 and 86 are moved to the center, the transmission will remain in the neutral condition since the reverse clutch 14 is dumped through the passageway 180, 186 and 96 to the reservoir 24 and the forward clutch 33 is dumped through the port F, the passageway 179 and the passageway 96 to the reservoir 24. Therefore, in either condition, that is, with both of the solenoids 42 and 40 energized or deenergized, the vehicle transmission will be in the neutral condition.

First range - FIG. 5 also illustrates the position of the valve members 90 and 92 to supply fluid through the port 1 to the first range clutch. At this point, the system will be in the condition of filling the first range clutch 15.

To accomplish this, fluid under pressure of about 350 p.s.i. flows through into the passageway 72, passing through ports 76 in the control member 74 and then through the orifice 80 into the passageway 78. Due to the high velocity of flow through the orifice 80, a pressure differential, as previously mentioned, is created between the passageway 78 and the passageway 82.

The effect of such pressure differential is illustrated in FIG. 5 wherein it can be seen that the trigger valve 108 has shifted to the left under the influence of such pressure differential. Shifting of the trigger valve 108 to the left connects a passageway 190 in the sleeve 102 which is connected to the signal chamber 100, to the drain passage 192, dumping the pressure in the signal chamber 100 to the reservoir 24, that is, to approximately atmospheric pressure.

At this point, the piston 138 remains in its leftmost position as illustrated since the pressure in the passageway 140 is connected to the reservoir 24 through a port 192. Pressure in chamber 78, which is same as pressure in chamber 132, is always equal to the sum of the spring forces of 134 and 106 divided by the cross-sectional area of the member 74. During fill, spring 106 is fully relaxed. Hence, spring 134 determines pressure in chamber 78 and chamber 132 during fill. This is called the fill pressure and typically is about 60 p.s.i. It is more or less constant during fill except for short transient in the beginning and end of clutch fill.

Simultaneously with the foregoing, fluid flows from the port 1 into the signal chamber 100 past the check valve and orifice assembly 124. As soon as the clutch 15 is filled with fluid, but not engaged, flow through the orifice 80 decreases and accordingly, the pressure in the passageway 78 equalizes with the pressure in the passageway 82. As the pressure equalizes, the force exerted by the spring 110 on the trigger valve 108 urges it to the right. The trigger valve 108 cannot return rapidly to the initial position due to the check valve 114 in the passageway 112 and the orifice 116 in the passageway 82 which restricts the flow of fluid therethrough.

During the flow of filling fluid through the passageway 78 into the clutch 15, the pressure was at approximately 60 p.s.i. as the clutch 15 filled. This is illustrated at 200 in FIG. 7. The delayed movement of the trigger valve 108 to the right maintains the port 190 open to both the signal chamber 100 and to the reservoir 24 for a short period of time which makes a smooth transition from the fill mode to the pressure modulation mode which will be described later. This short delay also allows complete resetting of the member 104 even if the clutch displacement is extremely small.

Figure 6:
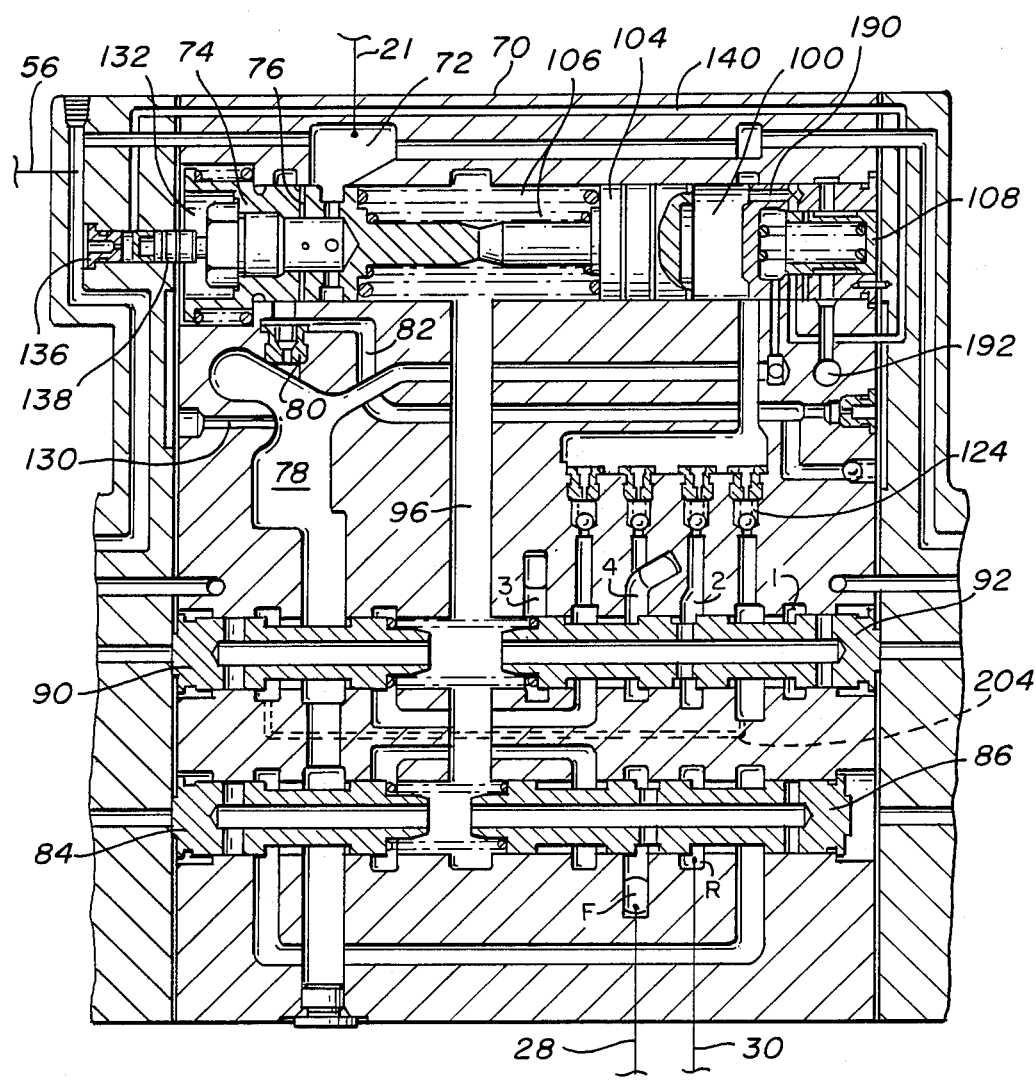
FIG. 6 is a view similar to FIG. 5 but illustrating the parts of the transmission in the positions they occupy after the clutch has been filled.

Upon the return of the trigger valve 108 to the right as illustrated in FIG. 6, the signal chamber 100 is closed since the passageway 190 is no longer open to the reservoir 24. Passageway 140, which was also connected to reservoir 24 through passageway 192, also closes when member 108 returns to the righthand position after clutch fill. Regulated pressure from chamber 56 was draining down through orifice 136 and passageway 140 and 192 while the member 108 had shifted to the left during fill. After clutch fill, when passage 192 is blocked, pressure in chamber 140 quickly becomes equal to the regulated pressure (typically 350 p.s.i.). This pressure acting on member 138 exerts a force on member 74 which opposes the springs 134 and 106. Since pressure in chamber 78 is due to the springs 134 and 106 (as described earlier), force exerted by member 138 drops the pressure in chamber 78 immediately after completion of clutch fill. This drop is approximately 20 p.s.i. and is illustrated at 202 in FIG. 7.

Figure 7:
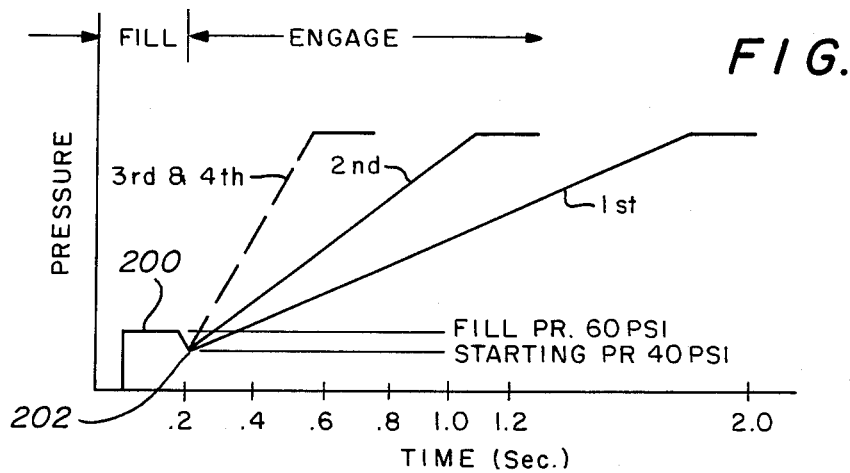
FIG. 7 is a curve illustrating the pressures in the clutch during the fill and times required when actuating the valve.

After clutch fill, oil flow through orifice 80 drops sharply and pressures in chambers 82 and 78 become nearly equal. However, because of spring 134 chamber 78 remains at a higher pressure than chamber 100 and oil flows into chamber 100 through orifice check valve assembly 124. This causes the piston 104 to move gradually to the left which compresses spring 106. Pressure begins to increase therein as is illustrated in FIG. 7 by the line labeled "1st". Since the pressure is increasing in the signal chamber 100 through the single check valve and orifice assembly 124, it takes approximately 2 seconds to increase the pressure therein sufficiently to drive the plunger 104 to the left against the force of the spring 106. Eventually, plunger 104 makes contact with member 74 and pushes it to the left. Pressure in chamber 78 becomes equal to the regulated pressure (chamber 21) through passage 76.

The presence of the check valves in the assemblies 118, 120, 122 and 124, assures that pressure in the signal chamber 100 is trapped until such time as the clutch 15 is intentionally dumped returning the valve members to the positions illustrated in FIG. 1. In some of the previously constructed transmission control systems, temporary loss of charge pump pressure due to cavitation or entrapped air could cause the system to recycle. This means that the transmission would be placed in a condition wherein no clutch was engaged until the cycle was completed. Due to the entrapment of the signal chamber fluid, such false indications of valve shifts and recycling cannot occur in the control system 10.

As previously mentioned, the valve members 90 and 92 are illustrated in FIGS. 2, 5 and 6 in the positions they occupy when the first range speed clutch 15 is engaged. Fluid flows from the passageway 78 through a passageway 204 that is shown in dotted lines connecting the passageway 78 directly to the port 1.

Figure 8:
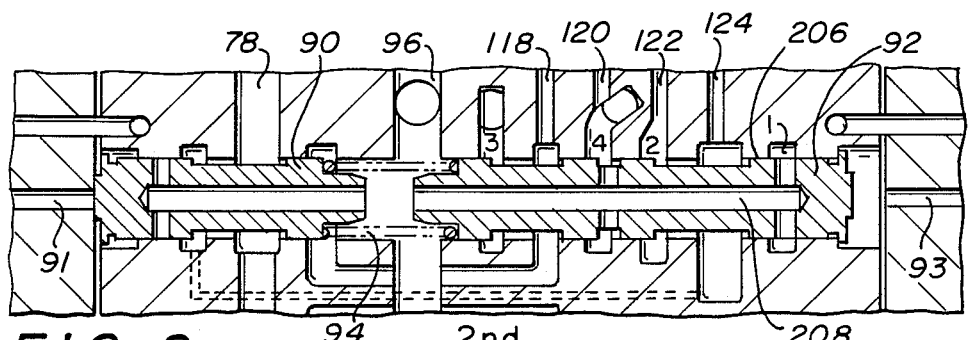
FIG. 8 is an enlarged fragmentary view illustrating parts of the range control of the transmission when the transmission has been shifted to second range.

Second range - When it is desired to shift to second range, the solenoid 62 is energized causing fluid to flow through the passageway 93 moving the valve member 92 to the left as illustrated in FIG. 8. A shoulder 206 on the valve member 92 blocks flow into the port 1 while port 2 is now connected through the passageway 204 to supply the passageway 78. It will also be noted that even though port 1 is blocked, the orifice and check valve assembly 124 remains in fluid communication with the passageway 204 providing fluid flow into the signal chamber 100 therethrough. The orifice and check valve assembly 122 is also connected to the port 2 and thus also supplies fluid into the signal chamber 100. Thus, when the valve member 92 is shifted to the left, to provide flow into the second range clutch 17, fluid having a substantially higher flow rate enters the signal chamber 100 than was true in the first range, and thus the second range has a greater slope during actuating of the clutch 17 as was illustrated by the curve labeled "2nd" in FIG. 7. To energize the second range clutch 17 takes only about 1 second as shown in FIG. 7.

Movement of the valve member 92 to the left also opens a passageway 208 in the interior of the valve member 92 to the port 1 and connects that port with the passageway 96 which leads to the reservoir 24. Thus, while the second range clutch 17 is being actuated, the pressure in the first range clutch 15 is being dumped to the reservoir 24. It will also be noted that the fourth range clutch 18 is exposed to atmospheric through the same passageway 208. The third range clutch 16 is connected from the port 3 through a passageway 210 to the passageway 96, thus exposing the port 3 and the third range clutch also to atmospheric. As can be appreciated from the above description, in this condition, all the clutches with the exception of the second range clutch 17 are exposed to atmospheric as the second range clutch 17 is being energized.

Figure 9:
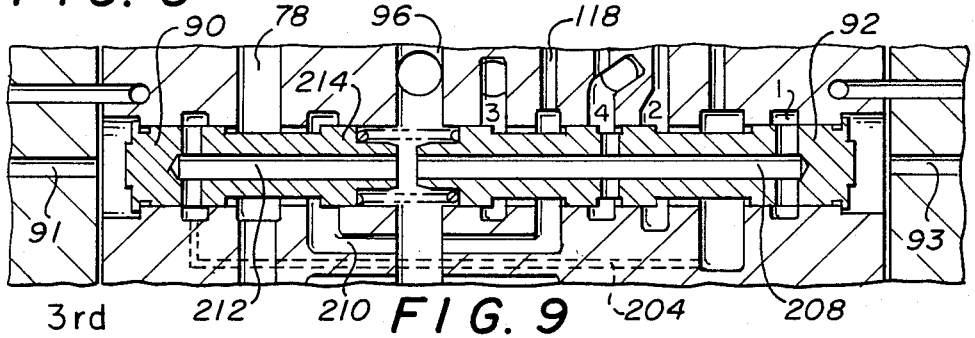
FIG. 9 is a view similar to FIG. 8 but illustrating the parts of the transmission when the transmission is in the third range.

Third range - FIG. 9 illustrates the arrangement of the valve members 90 and 92 when the third range clutch 16 is being energized. As shown therein, the valve member 92 remains in the leftmost position. The solenoid 60 is energized directing pressurized fluid through the passageway 91, shifting the valve member 90 to the right. When this occurs, the passageway 204 is connected to atmospheric through a passageway 212 located in the interior of the valve member 90. Connecting the passageways 204 and 212 in this manner dumps the second range clutch 17 to the reservoir 24 or to atmospheric.

A land 214 on the valve member 90 has shifted to the right, opening the passageway 210 to the fluid in the passageway 78. The opposite end of the passageway 210 is connected to port 3 and to the valve and orifice assembly 118. The remaining ports 1, 2 and 4 are all connected to the reservoir 24, thus dumping those clutches 15, 17 and 18.

It should be pointed out that the orifices located in the orifice and valve assemblies 118, 120, 122 and 124 can be sized appropriately to provide for different flow rates into the signal chamber 100 in accordance with the speed at which it is desired to increase clutch pressure. As illustrated in FIG. 7, the third range clutch rate of actuation is indicated by the line labeled with the designation "3rd" and "4th". Thus, it will be appreciated that the orifice in the orifice and check valve assembly 118 is substantially larger than that in the orifice and valve assembly 124 since it takes only about 0.60 of a second to fully engage the third range clutch 16.

Figure 10:
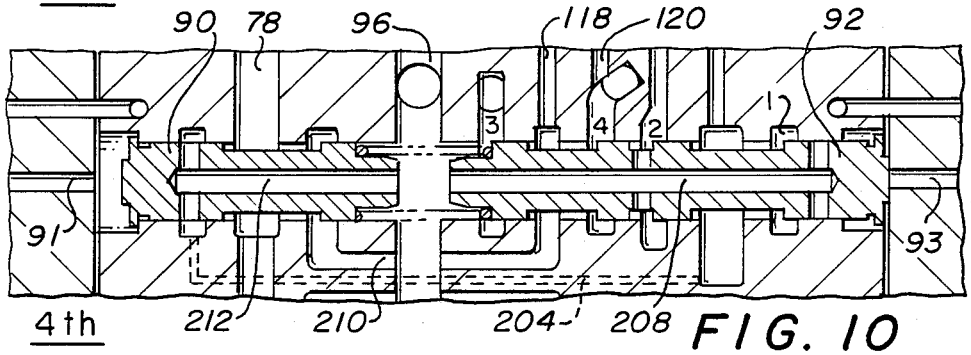
FIG. 10 is a view similar to FIG. 8, but illustrating the parts of the transmission in the positions they occupy when the transmission is in the fourth range.

Fourth Range - FIG. 10 illustrates the position of the valve members 90 and 92 during energizing of the fourth range clutch 18. Solenoid 62 has been deenergized permitting the valve member 92 to return to the right end position while the valve member 90 remains in its rightmost position since the solenoid valve 60 remains energized.

With the valve members in this condition, it will be noted that port 1 remains exposed to the reservoir 24 through the passageways 204 and 212. Port 2 is dumped to the reservoir 24 through the passageways 208 and 96 and port 3 is exposed directly to the passageway 96. Thus, while the fourth range clutch 18 is being energized, the ports 1, 2 and 3 are all exposed to atmospheric.

Fluid reaches the port 4 from the passageway 78 by flowing through the passageway 210. When filling the fourth range speed clutch 18, both of the orifice and valve assemblies 118 and 120 are connected into the signal chamber 100 so that the fourth range clutch 18 is also fully engaged very rapidly as indicated in FIG. 7.

It will be understood that each of the speed range clutches for second, third and fourth range are subjected to the rapid fill and a controlled rate of engagement as illustrated by the curve of FIG. 7 and as previously described in connection with the energizing of the first range speed clutch 15. Accordingly, the transmission control system 10 described provides for the rapid filling of the clutches and proper energization thereof without the transmission shock due to the control of the engagement portion of the clutch actuation. The transmission control system 10 described utilizes only four solenoids for controlling four shiftable valve members to provide a transmission control having four forward and four reverse speeds in a heavy duty vehicle. Since the valve members are arranged to dump all the clutches to reservoir or atmospheric each time that a clutch is energized, and since only two clutches or two solenoids are utilized to control the speed ranges, the system eliminates the difficulties that have been encountered in some of the transmission controls wherein more than one speed range clutch can be engaged at the same time.

Emergency Mode - It should also be pointed out that the system includes the emergency hydraulic controls shown in FIG. 4. In the event that an electrical system failure does occur, the speed range valve members are biased toward the first range position as illustrated in FIG. 2 by the spring 94, and thus the system automatically goes into a first range speed or drive mode.

As previously described, the forward and reverse control system is in neutral when the valve members 84 and 86 are both either deenergized or both energized. Thus, when an electrical failure occurs, the transmission control system automatically goes into a neutral direction drive situation. Movement of the lever 172 on the hydraulic emergency system places the vehicle transmission in either forward or reverse so that the vehicle can be moved as desired in either forward or reverse in the first drive speed.

OPERATION OF THE MODIFIED VALVE OF FIG. 11

When it is desired to have a slower initial pressure rise rate during clutch engagement, the modification according to FIG. 11 will be utilized. With the piston 104 in the right position as illustrated in FIG. 11, a portion of the fluid filling the signal chamber 100 bleeds off to the reservoir 24. The amount of bleed off that occurs depends upon the size of the orifice 302 that has been placed in the passageway 300.

Figure 12:
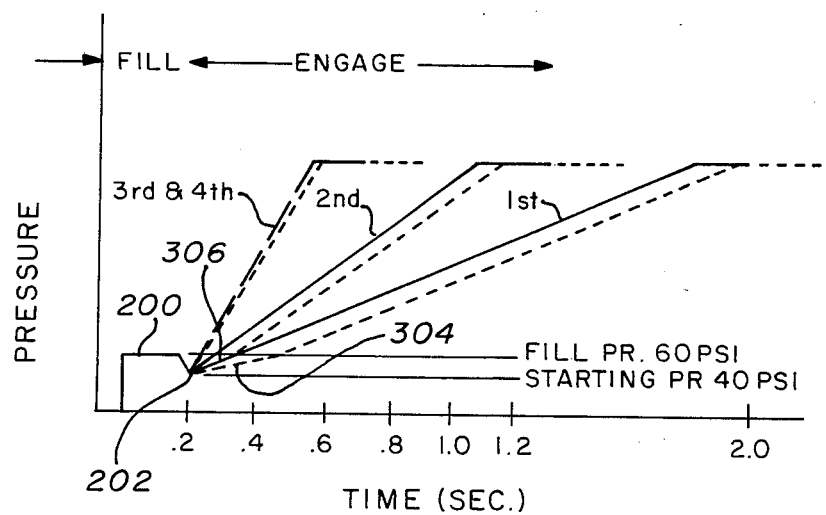
FIG. 12 is a view similar to FIG. 7, but illustrating the effect of the modification of FIG. 11.

The effect of such slower initial pressure rise rate is illustrated in FIG. 12 by the flatter portion of the curves in first and second speed ranges as indicated by the reference characters 304 and 306. Because of the extreme rapid pressurizing of the third and fourth speed ranges, little effect is noticed in those ranges.

The effect of the modification is to reduce the shift shock by slowing down the initial pressurization portion. As the modulator piston 104 moves to the left during pressurization, the passageway 300 is closed by the piston 104 and normal pressure rise rate resumes. It will be understood that many changes and modifications can be made to the described embodiments without departing from the spirit or scope of the invention.

What is claimed is:

1. A control system for actuating a transmission that includes a hydraulic clutch, said system comprising:

value means for controlling fluid flow to and from the clutch, said value means including a valve housing having a flow passageway therethrough, a valve spool located in said housing for movement between positions permitting and preventing flow through said passageway to the clutch, and means for moving said valve spool between said positions;

clutch fill control means for rapidly filling the clutch when the clutch is to be actuated, said fill control means including a signal pressure chamber in the housing, a relief passageway in the housing connecting said chamber to atmospheric pressure, and an orifice in said flow passageway causing a differential pressure thereacross when said valve spool is in the open position permitting flow therethrough, a fill control trigger member movable in said housing to permit and prevent flow through said relief passageway in response to said differential pressure, said trigger member, when moved by said differential, reducing the pressure in said signal chamber to atmospheric, resilient means biasing said trigger member toward the closed position, preventing flow from said chamber, and conduit means arranged to connect said signal chamber with the clutch whereby filling of the clutch essentially stops flow through said orifice, reducing said differential pressure, permitting said resilient means to move said trigger member to the closed position and stopping flow from said signal chamber to atmospheric pressure; and pressure control means for lowering the pressure fluid in the clutch after filling and for gradually increasing the pressure in the clutch until the clutch is fully engaged.

2. The system of claim 1 wherein said pressure control means includes:

orifice means for controlling the movement of said trigger member to the closed position thereby allowing the fluid pressure in the clutch and said signal chamber to drop below the pressure downstream of said first mentioned orifice;

flow restriction means in said housing moveable from a fill position permitting full flow into said flow passageway to a pressure position permitting limited flow into said flow passageway;

spring means biasing said flow restriction means toward said fill position;

pressure responsive means engaging said flow restriction means for moving said flow restriction means to said pressure position;

a pressure rate control member having an end defining part of said signal chamber, said rate control member being moveable in said housing in response to a pressure increase in said signal chamber; and, said spring means also yieldably engaging said rate control member whereby said signal chamber volume increases as said rate control member moves for permitting a controlled rate increase in pressure on the clutch until the clutch is fully engaged.

3. A control system for a multi-speed, reversible transmission that includes first and second speed clutches and forward and reverse clutches, said control system comprising:

speed valve means for controlling fluid flow to and from the first and second speed clutches;

forward and reverse valve means for controlling fluid flow to and from the forward and the reverse clutches in the transmission, said forward and reverse valve means each including an electrically actuated reverse solenoid valve connected with a source of pressurized fluid, an electrically actuated forward solenoid valve connected with said pressurized fluid source, a forward and reverse fluid control valve connected with said source of pressurized fluid, and a forward and reverse valve movable in response to said solenoids to control flow of said fluid to said forward and reverse clutches and movable in response to said fluid control valve to control flow of said fluid to said forward and reverse clutches;

means biasing said speed valve means to a position to direct fluid to said first speed clutch when said forward and reverse solenoid valves are disabled;

clutch fill control means for rapidly filling each said clutch when the clutch is to be engaged; and, pressure control means for lowering the pressure of fluid in the speed clutch to be engaged after filling and for gradually increasing the pressure of fluid in the speed clutch to be engaged until said clutch is fully engaged.

4. The system of claim 3 wherein said speed valve means also includes biasing means for urging said speed valve means to direct fluid flow into said first speed clutch whereby said first speed clutch will be engaged unless said speed valve means is directing flow to said second speed clutch.

5. A method of shifting a transmission including a hydraulic clutch, the method comprising the steps of:

rapidly filling the clutch with hydraulic fluid;

sensing a differential pressure across an orifice when rapidly filling the clutch;

shifting a trigger valve member when said differential ceases reducing the pressure in the clutch; and applying pressure at a controlled rate to engage the clutch to complete the shift without transmission shock.

6. The method of claim 5 and also including the step of reducing the pressure in the clutch to essentially atmospheric pressure.

7. A control system for multispeed, reversible transmission that includes first and second speed clutches and forward and reverse clutches, said control system comprising:

speed valve means for controlling fluid flow to and from the first and second speed clutches;

forward and reverse valve means for controlling fluid flow to and from the forward and reverse clutches in the transmission, each said forward and reverse valve means including an electrically actuated reverse solenoid valve connected with a source of pressurized fluid, an electrically actuated forward solenoid valve connected with said pressurized fluid source, a forward and reverse fluid control valve connected with said source of pressurized fluid, said forward and reverse control valve being movable from a neutral position wherein said fluid does not go to said forward or reverse clutch, to a forward position wherein said fluid is directed to said forward clutch, and to a reverse position wherein said fluid is directed to said reverse clutch, and a forward and reverse valve movable in response to said solenoids to control flow of fluid to said forward and reverse clutches and movable in response to said fluid control valve to control flow of said fluid to said forward and reverse clutches; and said speed valve means being arranged to direct fluid to said first speed clutch when said forward and reverse solenoid valves are disabled.

8. A control system for a multi-speed, reversible transmission that includes first and second speed clutches and forward and reverse clutches, said control system comprising:

speed valve means for controlling fluid flow to and from the first and second speed clutches;

forward and reverse valve means for controlling fluid flow to and from the forward and the reverse clutches in the transmission;

clutch fill control means for rapidly filling each said clutch when the clutch is to be engaged; and, pressure control means for lowering the pressure of fluid in the speed clutch to be engaged after filling and for gradually increasing the pressure of fluid in the speed clutch to be engaged until said clutch is fully engaged, said pressure control means including means for independently controlling the rate pressure is applied to each of the first and second speed clutches that includes a flow-respective orifice associated with each of the clutches that is sized to individually control the rate of flow to such clutch and includes a one-way flow valve associated with each said orifice that permits flow toward the clutches but prevents flow therefrom.

9. A control system for a reversible transmission comprising:

speed valve means for controlling fluid flow to and from a speed clutch in the transmission;

forward and reverse valve means for controlling fluid flow to and from the speed clutch in the transmission;

forward and reverse valve means for controlling fluid flow to and from the forward and reverse clutch in the transmission, each said forward and reverse valve means including an electrically actuated reverse solenoid valve connected with a source of pressure as fluid, an electrically actuated forward solenoid valve connected with said pressurized fluid source, a forward and reverse fluid control valve connected with said source of pressurized fluid, and a forward and reverse valve movable in response to said solenoids to control flow of said fluid to said forward and reverse clutches and movable in response to said fluid control valve to control flow of said fluid to said forward and reverse clutches;

clutch fill control means for rapidly filling each said clutch when the clutch is to be engaged; and, pressure control means for lowering the pressure of fluid in said speed clutch after filling and for gradually increasing the pressure of fluid in the speed clutch until said clutch is fully engaged.

10. The control system of claim 9 wherein said forward and reverse control valve is moveable from a neutral position wherein said fluid does not go to said forward or reverse clutch, to a forward position wherein said fluid is directed to said forward clutch, and to a reverse position wherein said fluid is directed to said reverse clutch.

11. A control system for a multi-speed, reversible transmission that includes first and second speed clutches and forward and reverse clutches, said control system comprising:

speed valve means for controlling fluid flow to and from the first and second speed clutches;

forward and reverse valve means for controlling fluid flow to and from the forward and the reverse clutchs in the transmission, said forward and reverse valve means including an electrically-actuated reverse solenoid valve connected with a source of pressurized fluid, an electrically-actuated forward solenoid valve connected with said pressurized fluid source, a forward and reverse fluid control valve connected with said source of pressurized fluid, and a forward and reverse valve movable in response to said solenoids to control flow of said fluid to forward and reverse clutches and movable in response to said fluid control valve to control flow of said fluid to said forward and reverse clutches;

clutch fill control means for rapidly filling each said clutch when the clutch is to be engaged; and, pressure control means for lowering the pressure of fluid in the speed clutch to be engaged after filling and for gradually increasing the pressure of fluid in the speed clutch to be engaged until said clutch is fully engaged.

12. The control system of claim 11 wherein said forward and reverse control valve is moveable from a neutral position wherein said fluid does not go to said forward or reverse clutch, to a forward position wherein said fluid is directed to said forward clutch, and to a reverse position wherein said fluid is directed to said reverse clutch.

* * * * *

UNITED STATES PATENT AND TRADEMARK OFFICE
CERTIFICATE OF CORRECTION

PATENT NO. : 4,871,048

DATED : October 3, 1989

INVENTOR(S) : Probir K. Chatterjea

It is certified that error appears in the above-identified patent and that said Letters Patent is hereby corrected as shown below:

Column 11, Line 3 (Claim 1, Line 3)

Change "value" to --valve--.

Column 11, Line 4 (Claim 1, Line 4)

Change "value" to --valve--.

Column 13, Line 25 (Claim 8, Line 19)

Change "flow-respective" to --flow-restrictive--.

Signed and Sealed this

Thirteenth Day of November, 1990

*Attest:*

HARRY F. MANBECK, JR.

*Attesting Officer*      *Commissioner of Patents and Trademarks*